United States Patent
Brüggemann et al.

(10) Patent No.: US 10,919,765 B2
(45) Date of Patent: Feb. 16, 2021

(54) OZONE GENERATION WITH DIRECTLY COOLED PLASMA

(71) Applicant: XYLEM IP MANAGEMENT S.à r.l., Senningerberg (LU)

(72) Inventors: Nicole Brüggemann, Enger (DE); Ralf Fiekens, Schlossholte-Stukenbrock (DE); Reiner Fietzek, Herford (DE); Manfred Salvermoser, Herford (DE)

(73) Assignee: XYLEM IP MANAGEMENT S.à r.l., Senningerberg (LU)

( * ) Notice: Subject to any disclaimer, the term of this patent is extended or adjusted under 35 U.S.C. 154(b) by 48 days.

(21) Appl. No.: 15/755,601

(22) PCT Filed: Aug. 24, 2016

(86) PCT No.: PCT/EP2016/069936
§ 371 (c)(1),
(2) Date: Feb. 27, 2018

(87) PCT Pub. No.: WO2017/036873
PCT Pub. Date: Mar. 9, 2017

(65) Prior Publication Data
US 2019/0023570 A1   Jan. 24, 2019

(30) Foreign Application Priority Data
Sep. 2, 2015 (EP) .................................. 15183513

(51) Int. Cl.
*C01B 13/11* (2006.01)
*D04C 1/06* (2006.01)

(52) U.S. Cl.
CPC ................ *C01B 13/11* (2013.01); *D04C 1/06* (2013.01); *C01B 2201/14* (2013.01);
(Continued)

(58) Field of Classification Search
None
See application file for complete search history.

(56) References Cited

U.S. PATENT DOCUMENTS

| 2,372,673 A | 4/1945 | Jacobs |
| 4,232,229 A | 11/1980 | Tanaka et al. |

(Continued)

FOREIGN PATENT DOCUMENTS

| CN | 201268807 Y | 7/2009 |
| DE | 20211429 U1 | 1/2003 |

(Continued)

OTHER PUBLICATIONS

International Preliminary Report on Patentability for Application No. PCT/EP2016/069936, dated Mar. 6, 2018, 7 pages.
(Continued)

*Primary Examiner* — Kishor Mayekar
(74) *Attorney, Agent, or Firm* — RatnerPrestia

(57) ABSTRACT

An ozone generator with a high voltage electrode and at least one counter electrode which limit a gap in which at least one dielectric is arranged and which is flowed through by a gas flow in the direction of flow. The high voltage electrode and the at least one counter electrode are provided with a connection for an electrical power supply to generate silent discharges. A fabric is arranged in the gas flow. The fabric includes a material combination including at least one wire and at least one electrically non-conductive fiber.

15 Claims, 1 Drawing Sheet

(52) U.S. Cl.
CPC ...... *C01B 2201/20* (2013.01); *C01B 2201/64* (2013.01); *C01B 2201/76* (2013.01)

(56) References Cited

U.S. PATENT DOCUMENTS

| | | | |
|---|---|---|---|
| 6,106,788 | A | 8/2000 | Rau et al. |
| 6,589,323 | B1 * | 7/2003 | Korin ........................ A61L 9/16 |
| | | | 96/223 |
| 7,458,677 | B2 * | 12/2008 | Morris ..................... B41J 29/13 |
| | | | 347/108 |
| 9,174,188 | B2 | 11/2015 | Fietzek et al. |
| 2003/0098230 | A1 * | 5/2003 | Carlow ................ B01D 53/323 |
| | | | 204/164 |
| 2004/0022701 | A1 * | 2/2004 | Segal ................ B01D 53/9454 |
| | | | 422/186.04 |
| 2005/0064248 | A1 * | 3/2005 | O'Donnell .......... C23C 16/4404 |
| | | | 428/702 |
| 2013/0008209 | A1 | 1/2013 | De Ridder et al. |

FOREIGN PATENT DOCUMENTS

| | | |
|---|---|---|
| WO | 8911908 A1 | 12/1989 |
| WO | 2012097970 A1 | 7/2012 |

OTHER PUBLICATIONS

International Search Report and Written Opinion for International Application No. PCT/EP2016/069936, dated Oct. 26, 2016, 10 pages.

\* cited by examiner

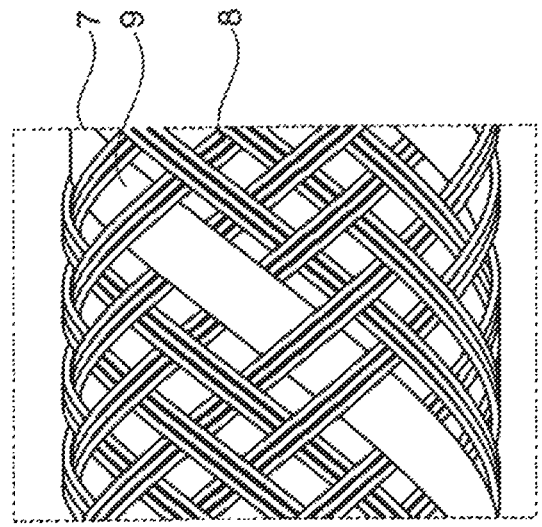
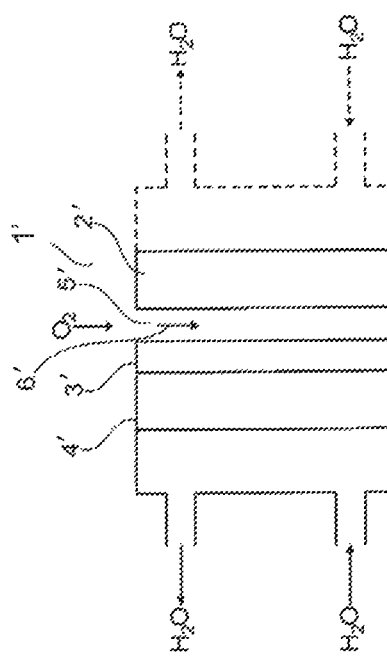
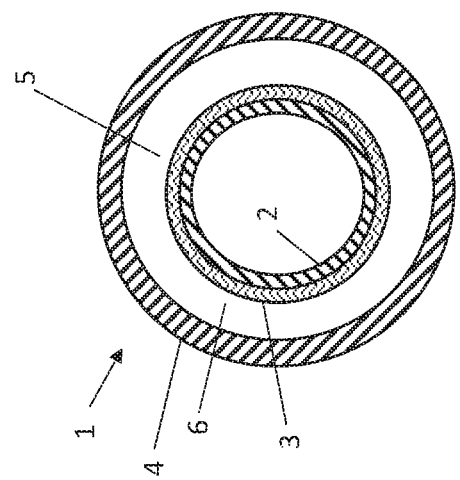

OZONE GENERATION WITH DIRECTLY COOLED PLASMA

CROSS-REFERENCE TO RELATED APPLICATIONS

This patent application is a U.S. National Phase Patent Application of PCT Application No.: PCT/EP2016/069936, filed Aug. 24, 2016, which claims priority to European Patent Application No. 15183513.9, filed Sep. 2, 2015, each of which is incorporated by reference herein in its entirety.

FIELD OF THE INVENTION

The present invention relates to an ozone generator with a high voltage electrode and at least one counter electrode which defines a gap in which at least one dielectric is arranged and through which flows a gas in a flow direction, and a fabric in a gas flow of an ozone generator.

BACKGROUND OF THE INVENTION

The efficiency of ozone generators depends to a great extent on the is temperature in the discharge gap. On the one hand, this is attributable to the fact that the ozone-forming reaction proceeds more effectively at low temperatures and on the other hand the kinetics of the ozone-destroying mechanism increases exponentially with the temperature. An effective cooling of the gap is thus essential for efficient ozone generation. Ozone generators which are cooled on one or two sides are known from the prior art. Their limiting factor, in terms of the transfer of heat, is the thermal conductivity within the discharge gap. The electrode material, for example stainless steel, conducts heat two to three times better in comparison with the gas which flows through the discharge gap.

An ozone generator is known from the patent application U.S. Pat. No. 4,232,229 which has a perforated metallic structure, which can for example be a wire mesh or a perforated metal sheet, in a discharge gap between a high voltage electrode and a counter electrode. The metal has a good thermal conductivity, as a result of which the transfer of heat within the discharge gap from the gas to the cooled boundary surface and thus also the efficiency of the ozone generator can be improved. Silent discharges are formed between the metallic structure and a high voltage electrode. The structure of the metal used to conduct away heat thereby defines an effective gap width.

An ozone generator is known from WO 8911908 A1 which has an electrode which is formed of woven stainless steel wires and is in contact with a dielectric. The finer the weave, the more discharge points are available for the silent discharge, which increases its effectiveness. However, the weave must not be too fine, since this results in a large discharge surface which generates is a correspondingly great amount of heat, which is in turn disadvantageous in terms of the generation of ozone.

SUMMARY OF THE INVENTION

It is the object of the present invention to provide an ozone generator which exhibits a good transfer of heat within the discharge gap. It is also the object of the invention to provide a fabric for use in a chamber of an ozone generator through which gas flows which conducts the heat efficiently.

The term "fabric" is known from the field of textile technology (woven or non-woven fabric). A textile fabric can refer to any two-dimensional structure which is manufactured from textile raw materials using a textile technology. Accordingly, in the context of the present patent application a fabric is understood to mean any flat, curved or convex two-dimensional structure which is manufactured using a textile technology. These include, among other things, non-woven fabrics such as textiles, knit fabrics, braided fabrics and nets, and fibre composites such as nonwovens and cotton wool-type material.

The aforementioned problem is solved by means of an ozone generator with a high voltage electrode (2, 2') and at least one counter electrode (4, 4') which defines a gap (5, 5') in which at least one dielectric (3, 3') is arranged and through which flows a gas (6, 6') in the direction of flow, wherein the high voltage electrode (2, 2') and the at least one counter electrode (4, 4') are provided with a connection for an electrical power supply to generate silent discharges, characterised in that a fabric (7) is arranged in the gas flow (6, 6'), said fabric (7) comprising a material combination consisting of at least one wire (8) and at least one electrically non-conductive fibre (9); and a fabric in a gas flow of an ozone generator (1), said gas flow having a direction of flow, characterised in that the fabric (7) comprises a material combination is consisting of at least one wire (8) and at least one electrically non-conductive fibre (9).

According to the invention, an ozone generator is provided with a high voltage electrode and at least one counter electrode, which limit a gap in which at least one dielectric is arranged and which is flowed through by a gas flow in a direction of flow, wherein the high voltage electrode and the at least one counter electrode are provided with a connection for an electrical power supply to generate silent discharges, and a fabric is arranged in the gas flow, wherein the fabric comprises a material combination consisting of at least one wire and at least one electrically non-conductive fibre.

Through the material combination of wire and electrically non-conductive fibre, the heat is effectively conducted out of the discharge gap, despite the presence of numerous discharge points.

Preferably, the at least one electrically non-conductive fibre forms a band which has a width which is at least 5 times as wide as the at least one wire. The electrically non-conductive fibres can also be worked into the band in the form of yarns.

In a preferred embodiment, the fabric is a woven or braided fabric, wherein the braided fabric is preferred in tube-type ozone generators, since hollow round cords can be manufactured particularly simply by means of braiding.

Preferably, the at least one non-conductive fibre lies in planar contact with the at least one dielectric. The contact with the dielectric allows the heat from the discharge gap to be conducted away via the non-conductive fibre.

It is advantageous if the ratio of wire mass per unit area to fibre mass per unit area decreases in the direction of flow. This causes the heat input into the discharge gap to be reduced in the direction of flow and the transfer of heat to increase in the direction of flow, so that the increase in temperature in the is direction of flow can be counteracted.

Preferably, the fabric is formed in a single piece, which makes it particularly simple to introduce into the gap.

The at least one electrically non-conductive fibre is preferably made of ceramic and/or glass.

In a preferred embodiment, the high voltage electrode is at least partially formed of the fabric. This includes the possibility that the entire high voltage electrode is formed of the fabric.

A fabric is also provided for use in a gas flow of an ozone generator which comprises a material combination consisting of at least one wire and at least one electrically non-conductive fibre.

The fibre thereby advantageously forms a band that is at least 5 times, preferably at least 10 times as wide as the at least one wire.

As already described, in an advantageous embodiment the ratio of wire mass per unit area to fibre mass per unit area decreases in the direction of flow.

It is thereby advantageous if the fabric is a woven fabric or a braided fabric.

In one embodiment, the fabric has at least one discrete region in which the at least one electrically non-conductive fibre is arranged and at least one further discrete region in which the fabric contains only wire and no electrically non-conductive fibre. Regions can thus be present which contain no electrically non-conductive fibre.

Preferably, the fabric is formed in a single piece, which makes it simple to introduce into the gap and economical to manufacture.

BRIEF DESCRIPTION OF THE DRAWING FIGURES

The state of the art and a preferred embodiment of the invention are is explained in more detail in the following with reference to the drawings, in which:

FIG. 1A: shows a diagrammatic representation of a plate-type ozone generator with one-sided or two-sided water-cooling from the prior art, FIG. 1B: shows a diagrammatic representation of a cross-section of a tube-type ozone generator from the prior art, and FIG. 2: shows a three-dimensional view of a fabric formed of wire and an electrically non-conductive fibre.

DETAILED DESCRIPTION OF THE INVENTION

FIGS. 1A and 1B shows an electrode arrangement of an ozone generator 1, 1'. Such ozone generators 1, 1' can be designed as a plate-type ozone generator 1' or a tube-type ozone generator 1, depending on the field of application.

Tube-type ozone generators are conventionally used grouped together in an ozone generating unit. The ozone generators are thereby arranged parallel to one another between two tube sheets in the manner of a tube bundle heat exchanger. Tube-type ozone generators 1 have a tubular-formed high voltage electrode 2, a tubular-formed dielectric 3 and a tubular-formed counter electrode 4. The arrangement is rotationally symmetrical. The high voltage electrode 2 and the counter electrode 4 are aligned concentrically with one another. They limit a gap 5 which is flowed through by an oxygen-containing gas and in which the dielectric 3 is arranged. The counter electrode 4, is arranged on the outside, is designed as a stainless steel tube. The waste heat generated during ozone production is cooled by means of cooling water which is passed along the outside of the counter electrode 4. The generator 1 can also be cooled on two sides in that cooling water flows through on the inside of the high voltage electrode 2.

Plate-type ozone generators 1' have a high voltage electrode 2' and at least one counter electrode 4' which are plate-formed in design. The electrodes 2', 4' limit a gap 5' which is flowed through by an oxygen-containing gas 6' and in which the dielectric 3' is arranged. Conventionally, plate-type ozone generators are cooled on one or two sides by means of air which is passed along the outer sides of the electrodes 2', 4'.

According to the invention, a fabric 7 is introduced into the gas flow 6 of an ozone generator 1, 1' (plate-type or tube-type generator), said fabric consisting of both wire 8 and also an electrically non-conductive material 9. The wire 8 defines the discharge points for the silent discharge and the electrically non-conductive material 9 establishes a direct thermal coupling to the discharge and the adjacent surfaces. For this purpose the wire 8 and the non-conductive material 9 are in contact at numerous points. In contrast to the wire 8, the non-conductive material 9 is two-dimensional in form, so that the non-conductive material 9 comes into planar contact with the electrode 2, 2' and the dielectric 3,3'. The contact surface area should thereby be as extensive as possible. No discharges take place in the region of the electrically non-conductive material 9. The coupling of the non-conductive material 9 with the wire 8 allows the heat generated by the discharges to be conducted away effectively. The electrically non-conductive material 9 is ozone- and corrosion-resistant. Preferably, the electrically non-conductive material 9 is a ceramic fibre or a glass fibre.

In one embodiment, the fabric 7 forms one of the electrodes 2, 2', 4, 4', preferably the high voltage electrode 2, 2'. It is thereby advantageous if the electrically non-conductive material 9 is positioned within the fabric 7 such that the material 9 is at least partially in planar contact with an adjacent dielectric 3, 3'.

FIG. 2 shows a tubular-formed electrode made of a fabric 6. The wire 8 and the electrically non-conductive material 9 are braided together to form the tubular-formed electrode. A band formed of the electrically non-conductive material 9 is around seven times as wide as the wire 8. The wire width is thereby defined as the diameter of the wire 8 and the band width of the electrically non-conductive material 9 consisting of fibres is defined as the extension of the band perpendicular to the length of the fibre. The width of the band is thus significantly greater than the wire width. In contrast to the wire 8, which makes point-formed contact, the band makes planar contact. The band width is selected such that a contact surface area of the fibres 9 with for example an adjoining dielectric 3, 3' is as great as possible, which leads to an effective conduction of the heat out of the discharge gap 5, 5'. In an advantageous embodiment, the mass of the electrically non-conductive material 9 per unit area increases in the direction of flow. The discharge points per unit area decrease with the increase in the mass of the electrically non-conductive material 9, as a result of which fewer discharges take place per unit area and thus less energy in the form of heat is introduced into the discharge gap 5, 5'. In this way, the temperature gradients along the direction of flow produced in an ozone generator 1 can be counteracted, so that the temperature is also kept as low as possible at the end of the ozone generator 1, in the direction of flow. The mass of the electrically non-conductive material 9 per unit area can be varied, for example in that the band width, the number of bands 9 or the spacing between the bands or fibres 9 are increased or decreased.

It is also possible for fabrics 7 to be introduced into sections of the discharge gap 5, 5' which are formed of only one material, for example wire 8 or electrically non-conductive material 9. For example, a form of intermediate cooling can be effected through the introduction, in sections, of electrically non-conductive material 9. It is also possible only to use the electrically non-conductive material 9 in an end region of the ozone generator, because the temperature in the discharge gap 5, 5' is particularly high there and an effective cooling is desirable.

Preferably, the wires are made of stainless steel.

All the described embodiments are used both in tube-type ozone generators, as shown in FIG. 2 and also in plate-type ozone generators. They can be used in both single-gap and multiple-gap systems.

The fabric can form one of the electrodes, be part of an electrode, for example in that the fabric is laid on the electrode and both are jointly connected to a power supply, or it can also be arranged between the electrodes.

The ozone generator according to the invention, along with the fabric, improves the efficiency of ozone generators in that the transfer of heat within the discharge gap is increased. The distribution of discharges can be influenced in a controlled way through the use of electrically non-conductive material. Furthermore, the electrically non-conductive material can have the greatest possible contact surface area with the adjacent surfaces of the electrodes and/or dielectric, which makes the transfer of heat more effective.

The invention claimed is:

1. An ozone generator comprising:
a high voltage electrode,
at least one counter electrode,
at least one dielectric arranged between the voltage electrode and the least one counter electrode,
a gap between the voltage electrode and the least one counter electrode through which a gas can flow in a direction of flow,
a connection on the high voltage electrode and the at least one counter electrode for an electrical power supply to generate silent discharges, and
a fabric arranged in the gas flow, said fabric comprising a material combination including at least one conductive wire and at least one electrically non-conductive fiber interposed with one another in a single woven or non-woven fabric structure, wherein the at least one electrically non-conductive fiber consists of electrically non-conductive material.

2. The ozone generator according to claim 1, wherein the at least one electrically non-conductive fiber comprises a band which has a width which is at least 5 times as wide as the at least one wire.

3. The ozone generator according to claim 2, wherein the band is at least 10 times as wide as the at least one wire.

4. The ozone generator according to claim 1, wherein the woven or non-woven fabric structure is a braided fabric structure.

5. The ozone generator according to claim 1, wherein the at least one electrically non-conductive fiber is in planar contact with the at least one dielectric.

6. The ozone generator according to claim 1, wherein a ratio of conductive wire mass per unit area to non-conductive fiber mass per unit area decreases in the direction of flow.

7. The ozone generator according to claim 1, wherein the at least one electrically non-conductive fiber consists of either ceramic or glass.

8. The ozone generator according to claim 1, wherein the high voltage electrode is at least partially formed of the fabric.

9. The ozone generator according to claim 1, wherein the fabric has at least one discrete region having the at least one electrically non-conductive fiber interposed with the least one conductive wire and at least one further discrete region in which the fabric contains no electrically non-conductive fiber.

10. The ozone generator according to claim 1 wherein the material combination consists of the at least one conductive wire and the at least one electrically non-conductive fiber.

11. The ozone generator according to claim 10, wherein the woven or non-woven fabric structure is selected from the group consisting of: knit fabrics, braided fabrics, nets, and fiber composites.

12. The ozone generator according to claim 10, wherein the woven or non-woven fabric structure defines a two-dimensional structure that is flat, curved, or convex.

13. The ozone generator according to claim 10, wherein the woven or non-woven fabric structure defines a tubular structure.

14. The ozone generator according to claim 1, wherein the conductive wire and the non-conductive fiber are in contact with one another at a plurality of points.

15. The ozone generator according to claim 1, wherein the electrically non-conductive fiber is positioned within the fabric such that the electrically non-conductive fiber is at least partially in planar contact the at least one dielectric.

* * * * *